(12) United States Patent
Yong et al.

(10) Patent No.: US 11,753,232 B1
(45) Date of Patent: Sep. 12, 2023

(54) TRAY AND PACKAGING ASSEMBLY FOR DATA STORAGE DEVICES

(71) Applicant: Western Digital Technologies, Inc., San Jose, CA (US)

(72) Inventors: Kar Foong Yong, Penang (MY); Patricio Collantes, Jr., San Jose, CA (US); Khai Shiang Tan, Penang (MY)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/708,663

(22) Filed: Mar. 30, 2022

(51) Int. Cl.
*B65D 81/133* (2006.01)
*B29C 51/08* (2006.01)
*B65D 85/68* (2006.01)

(52) U.S. Cl.
CPC .......... *B65D 81/133* (2013.01); *B29C 51/082* (2013.01); *B65D 85/68* (2013.01); *B65D 2585/86* (2013.01)

(58) Field of Classification Search
CPC .. B65D 81/133; B65D 85/68; B65D 2585/86; B29C 51/08; B29C 51/082
USPC .......... 206/562–564, 591–594, 308.2, 308.3; 211/40
See application file for complete search history.

(56) References Cited

U.S. PATENT DOCUMENTS

| | | | |
|---|---|---|---|
| 5,794,796 A * | 8/1998 | Weisburn ........... | G11B 33/0461 206/307.1 |
| 6,786,334 B2 | 9/2004 | Smith | |
| 7,533,770 B2 * | 5/2009 | Lan ..................... | G11B 33/0444 206/308.1 |
| 7,584,851 B2 | 9/2009 | Hong et al. | |
| 7,810,639 B2 * | 10/2010 | Djulaini ............... | B65D 81/113 206/307 |

(Continued)

FOREIGN PATENT DOCUMENTS

JP 2006273333 A 10/2006

OTHER PUBLICATIONS

"Orico External Hard Drive Case 20-Bay Multi-Protection HDD Storage Box Carrying Case for 3.5" HDD/SSD Briefcase"; Amazon; Last accessed on Mar. 24, 2022; https://www.amazon.in/ORICO-Multi-Protection-Storage-Carrying-Hand-held/dp/B0714BK6RX/ref=asc_df_B0714BK6RX/?tag=googleshopdes-21&linkCode=df0&hvadid=396989704242&hvpos=&hvnetw=g&hvrand=7383999375720764693&hvpone=&hvptwo=&hvqmt=&hvdev=c&hvdvcmdl=&hvlocint=; 7 pages.

(Continued)

*Primary Examiner* — Bryon P Gehman
(74) *Attorney, Agent, or Firm* — LOZA & LOZA, LLP; Gabriel Fitch

(57) ABSTRACT

A tray for holding a plurality of storage drives includes a sheet of material formed to include: a plurality of tray sidewalls, each having a top edge and a bottom edge; a plurality of tray ends walls arranged relative to the plurality of tray sidewalls to define a plurality of corner regions, each tray end wall having a top edge and a bottom edge; at least one side extension included in each of the tray sidewalls; at least one corner extension included in a corner region; and a tray top spanning the tray sidewalls and the tray ends walls. The tray top includes a pair of top-side surfaces that extend inward from the top edge of a respective one of the tray sidewalls, and a central slotted structure spanning the top-side surfaces. The central slotted structure forms a plurality of slots, each configured to receive one of the plurality of storage drives.

21 Claims, 19 Drawing Sheets

(Top Perspective)

(56) References Cited

U.S. PATENT DOCUMENTS

2007/0077182 A1    4/2007   Huang
2009/0078601 A1    3/2009   Lin et al.
2011/0079538 A1    4/2011   Smith

OTHER PUBLICATIONS

"IMBAPrice Dual Pack of 4 Zipo 2.5" Two Latchable Hard Drive Protector Cases"; Cart2india Online Retail Pvt Ltd; Last accessed on Mar. 24, 2022; https://www.cart2india.com/hard-drive-enclosures/imbaprice-dual-pack-of-4-zipo-25-two-latchable-hard-drive-protector-cases/00000000004328699264?gclid=Cj0KCQiA8ICOBhDmARIsAEGI6o0UupoC%E2%80%A6; 2 pages.

"Seagate Expansion Portable External Hard Drive Rack Holder Case Caddy"; Etsy; Last accessed on Mar. 24, 2022; https://www.etsy.com/in-en/listing/1071469755/seagate-expansion-portable-external-hard?click_key=600552f8edb141da27eb98213991f4b872779933:1071469755&click_sum=9190e856&ga_order=m%E2%80%A6; 7 pages.

\* cited by examiner (Top Perspective)

(Bottom Perspective)

(Top View)

(Side View)

TRAY AND PACKAGING ASSEMBLY FOR DATA STORAGE DEVICES

FIELD

The disclosure relates, in some embodiments, to apparatuses for packaging and shipping data storage devices. More specifically, but not exclusively, the disclosure relates to a tray having multiple impact absorption layers, and configured to form a packaging assembly with another identical tray such that the assembly partially encloses one or more data storage devices for shipping.

INTRODUCTION

Hard disk drives and solid-state data storage devices (hereafter referred to as HDD and SSD storage devices or drives) are shipped to customers in boxes or containers. Packaging that fits within the container is used to protect storage devices against damage from vibration of the container or external shock impact on the container that may occur during transportation.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a tray for holding a plurality of storage drives. The tray comprises a sheet of material having a thickness and formed to include: a plurality of tray sidewalls, each having a top edge and a bottom edge; a plurality of tray ends walls arranged relative to the plurality of tray sidewalls to define a plurality of corner regions, each tray end wall having a top edge and a bottom edge; at least one side extension included in each of the tray sidewalls; at least one corner extension included in a corner region; and a tray top spanning the tray sidewalls and the tray ends walls. The tray top comprises a pair of top-side surfaces that extend inward from the top edge of a respective one of the tray sidewalls, and a central slotted structure spanning the top-side surfaces, the central slotted structure forming a plurality of slots, each slot configured to receive one of the plurality of storage drives. The plurality of tray sidewalls, the plurality of tray ends walls, the at least one side extension, the at least one corner extension, and the tray top have a thickness substantially equal to the thickness of the sheet of material.

One embodiment of the disclosure provides a packaging assembly that includes a pair of identical trays. Each tray comprises a plurality of tray sidewalls, each having a top edge and a bottom edge; a plurality of tray ends walls arranged relative to the plurality of tray sidewalls to define a plurality of corner regions, each tray end wall having a top edge and a bottom edge; at least one side extension included in each of the tray sidewalls; at least one corner extension included in a corner region; and a tray top spanning the tray sidewalls and the tray ends walls. The tray top comprises a pair of top-side surfaces that extend inward from the top edge of a respective one of the tray sidewalls, and a central slotted structure spanning the top-side surfaces, the central slotted structure forming a plurality of slots, each slot configured to receive one of a plurality of storage drives. The pair of identical trays are configured to at least partially enclose one or more storage drives for shipping.

One embodiment of the disclosure provides a method of fabricating a tray. The method comprises providing a material configured to be molded; providing a mold; and forming the material with the mold. The material is formed to include: a plurality of tray sidewalls, each having a top edge and a bottom edge; a plurality of tray ends walls arranged relative to the plurality of tray sidewalls to define a plurality of corner regions, each tray end wall having a top edge and a bottom edge; at least one side extension included in each of the tray sidewalls; at least one corner extension included in a corner region; and a tray top spanning the tray sidewalls and the tray ends walls. The tray top comprises a pair of top-side surfaces that extend inward from the top edge of a respective one of the tray sidewalls, and a central slotted structure spanning the top-side surfaces, the central slotted structure forming a plurality of slots, each slot configured to receive a storage drive.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

A packaging assembly disclosed herein includes a pair of identical trays configured to at least partially enclose one or more storage drives for shipping within a box. Each tray includes tray sidewalls and tray ends walls arranged relative to the tray sidewalls to define a plurality of corner regions. At number of side extensions are included in each of the tray sidewalls, and a corner extension is included in each corner region. These side and corner extensions provide a first layer of impact absorption for the packaging assembly.

A tray top spans the tray sidewalls and the tray ends walls. The tray top includes a pair of top-side surfaces that extend inward from a top edge of a respective one of the tray sidewalls, and a central slotted structure that spans the top-side surfaces. The arrangement of top-side surfaces relative to the tray sidewalls and central slotted structure provides a second layer of impact absorption for the packaging assembly.

Figure 19:
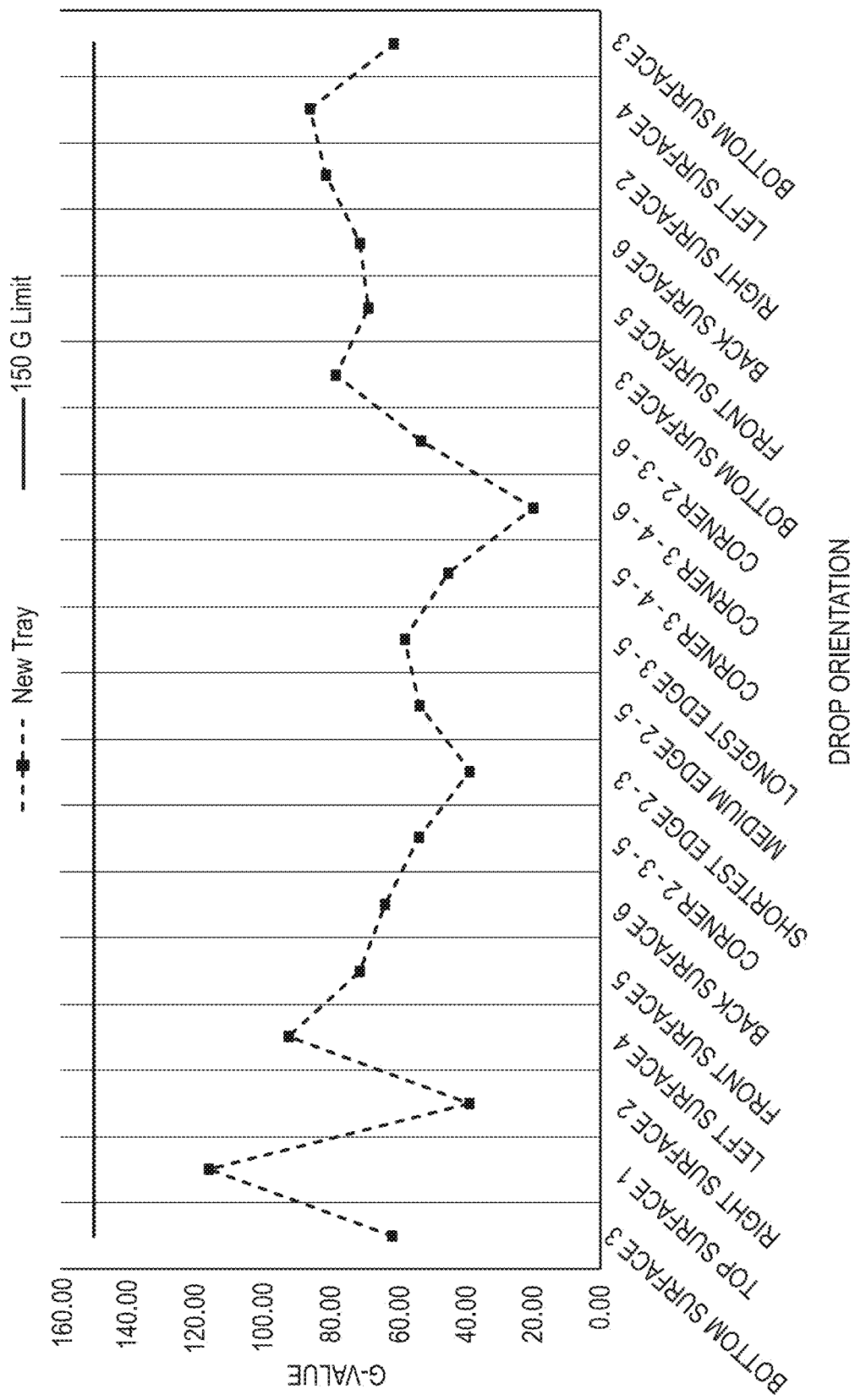
FIG. 19 is a graph showing the drop test results for storage drives packaged in a box using the packaging assembly of FIG. 15.

Drop testing of storage drives packed in a box using the packaging assembly disclosed herein resulted in shock values that did not exceed 150 G (e.g., where 1 G is the same as 1 g-force) throughout all drop orientations. FIG. 19 is a graph showing the G-values as a function of drop orientations, wherein all G-values are below the 150 G limit.

Having generally described a packaging assembly in accordance with one or more aspects of the disclosure, following are detailed descriptions of the tray, the packaging assembly, and a method of fabricating a tray.

Tray

Figure 1:
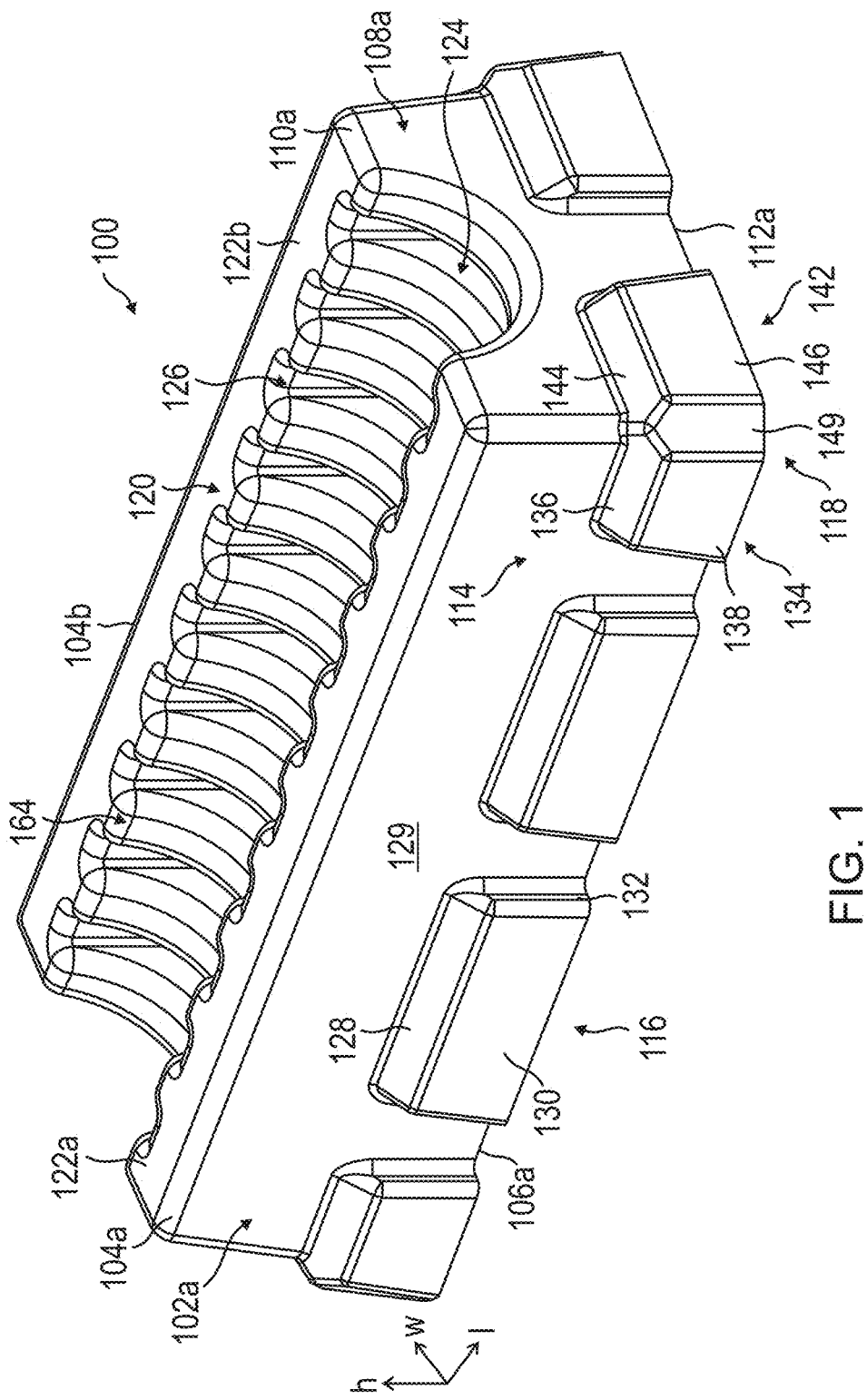
FIG. 1 is a top perspective illustration of a tray having a number of side extensions and corner extensions that provide a first layer of impact absorption and a tray top and tray sidewalls having portions that provide a second layer of impact absorption in accordance with one or more aspects of the disclosure.
Figure 2:
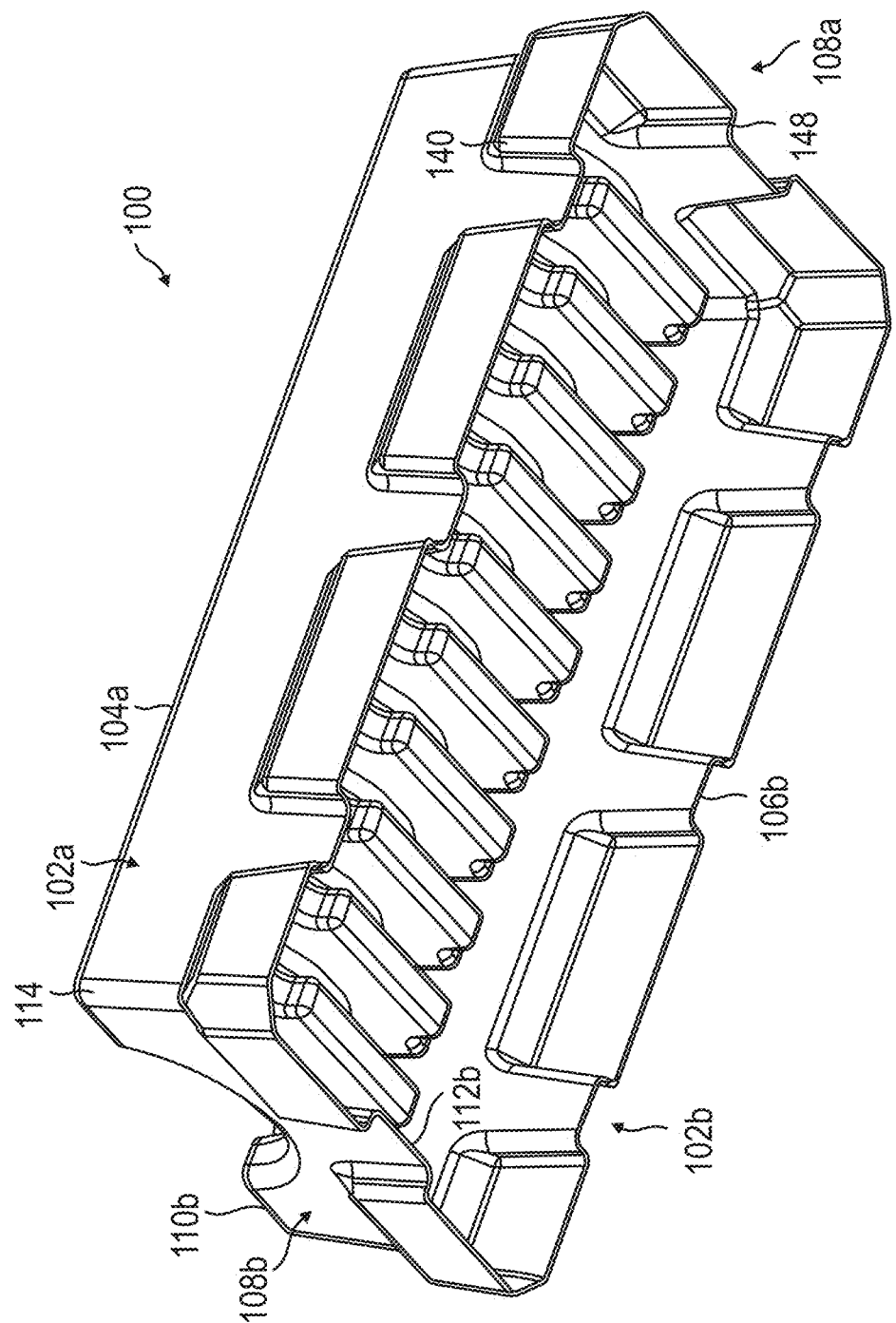
FIG. 2 is a bottom perspective illustration of the tray of FIG. 1 in accordance with one or more aspects of the disclosure.
Figure 3:
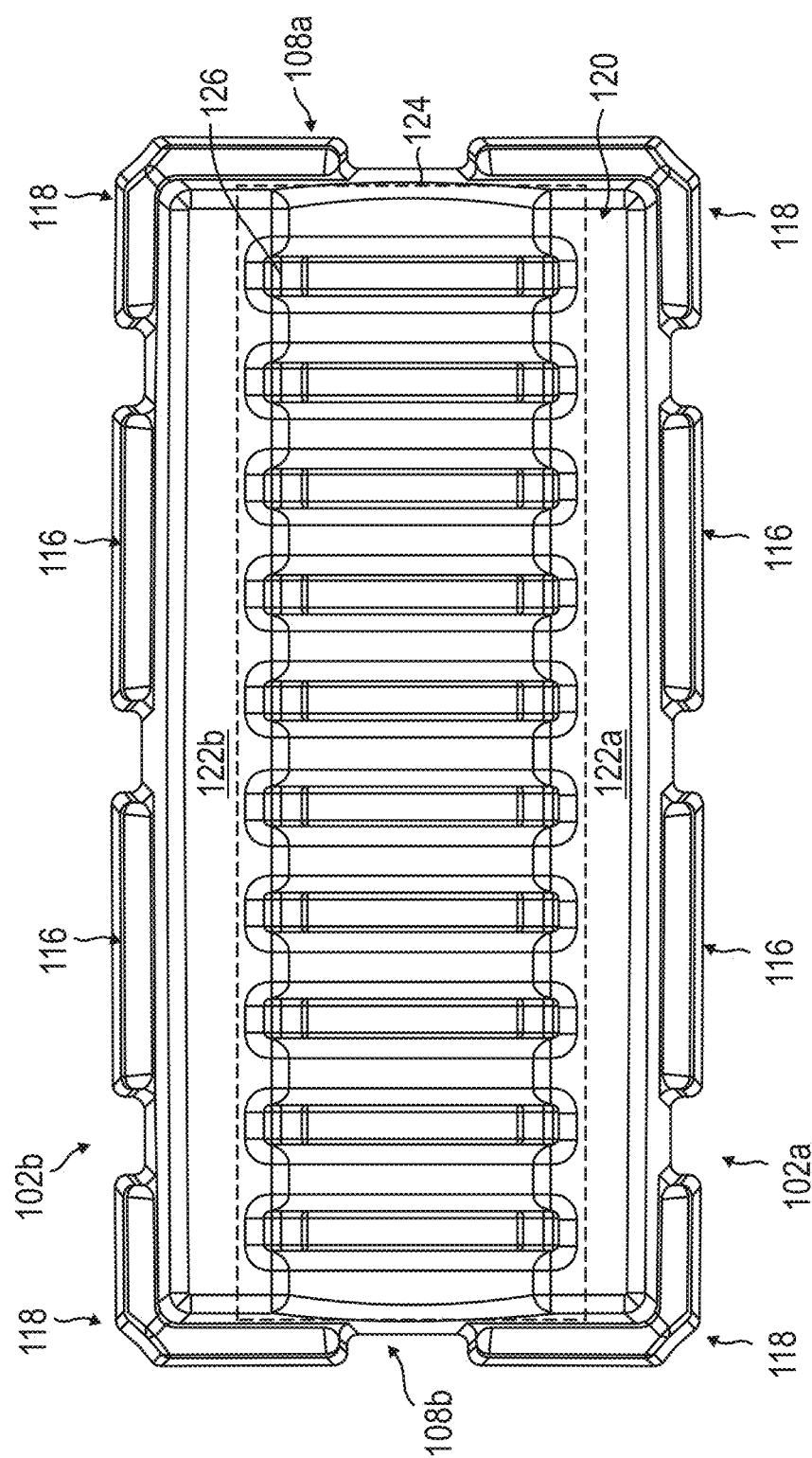
FIG. 3 is a top view of the tray of FIG. 1 in accordance with one or more aspects of the disclosure.
Figure 4:
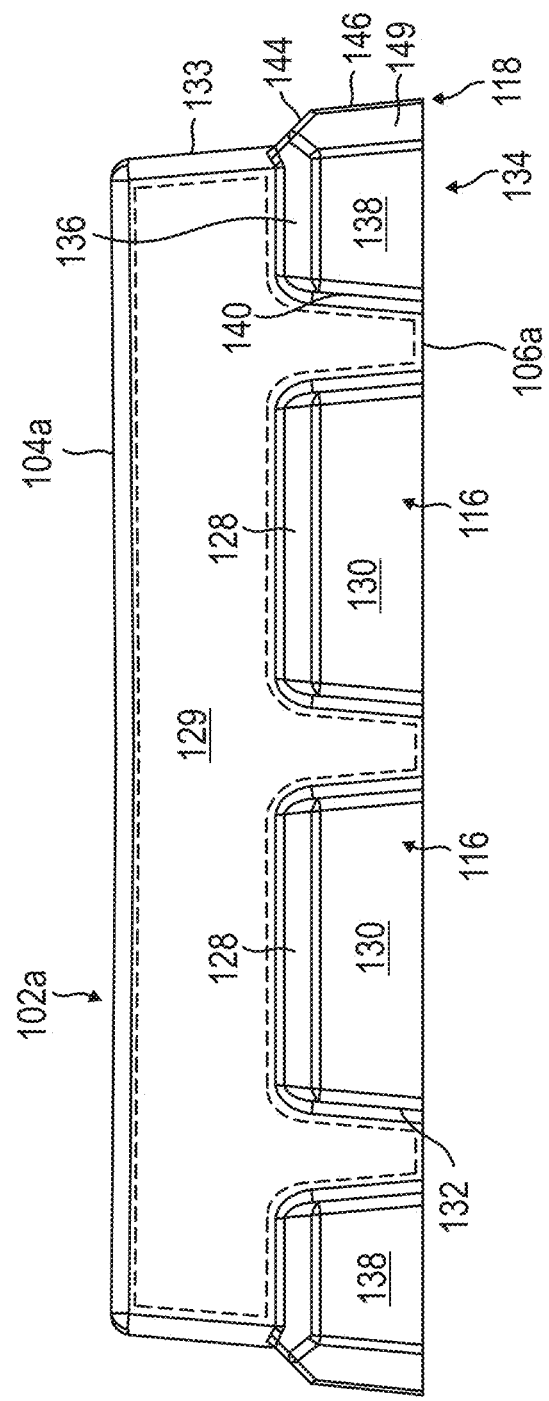
FIG. 4 is a side view of the tray of FIG. 1 in accordance with one or more aspects of the disclosure.
Figure 5:
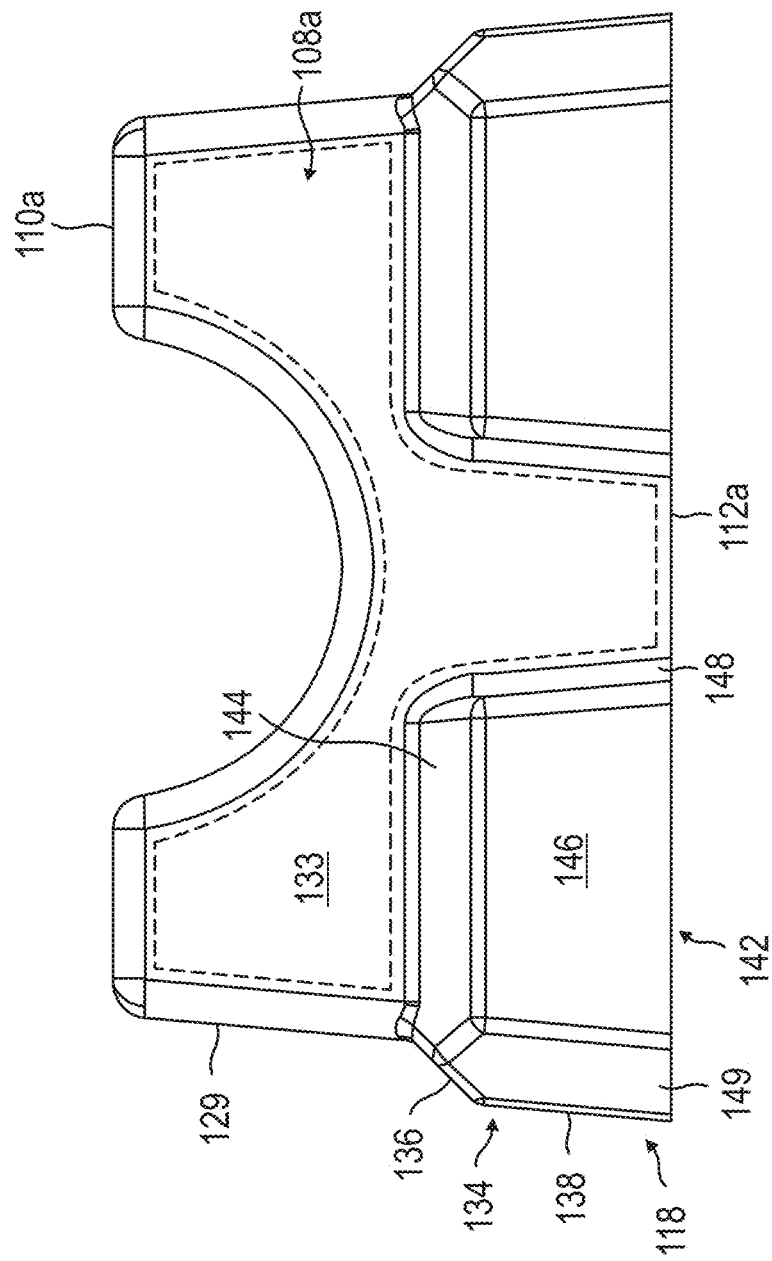
FIG. 5 is an end view of the tray of FIG. 1 in accordance with one or more aspects of the disclosure.

FIGS. 1-11 illustrate one embodiment of a tray 100 in accordance with one or more aspects of the disclosure. FIG. 1 is a top perspective illustration of a tray having a number of side extensions and corner extensions that provide a first layer of impact absorption and a tray top and tray sidewalls having portions that provide a second layer of impact absorption. FIG. 2 is a bottom perspective illustration of the tray of FIG. 1. FIG. 3 is a top view of the tray of FIG. 1. FIG. 4 is a side view of the tray of FIG. 1. FIG. 5 is an end view of the tray of FIG. 1.

Figure 6:
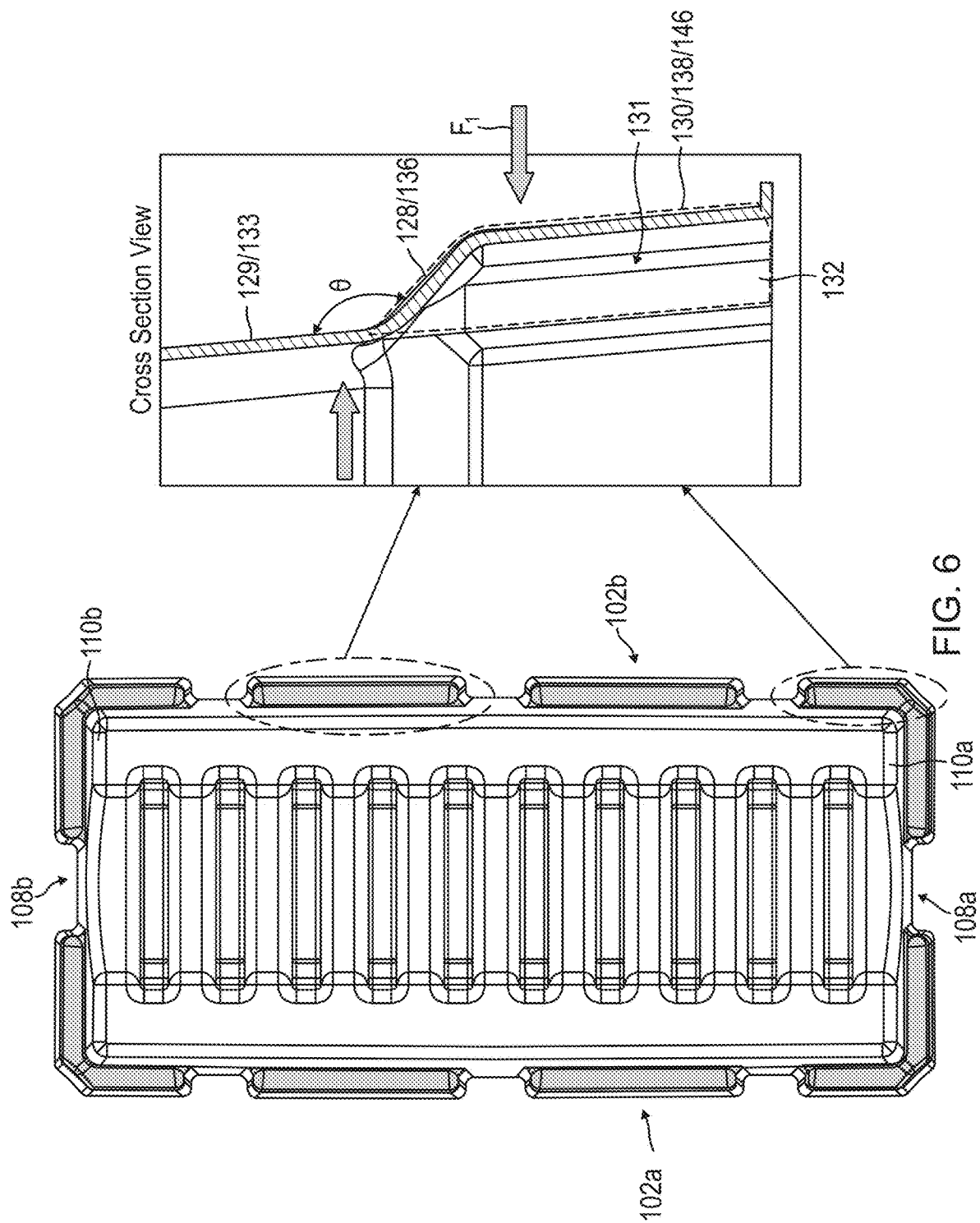
FIG. 6 is a top view of the tray of FIG. 1 highlighting a first layer of impact absorption provided by the side extensions and corner extensions and including a cross-section illustration through a side extension in accordance with one or more aspects of the disclosure.
Figure 7:
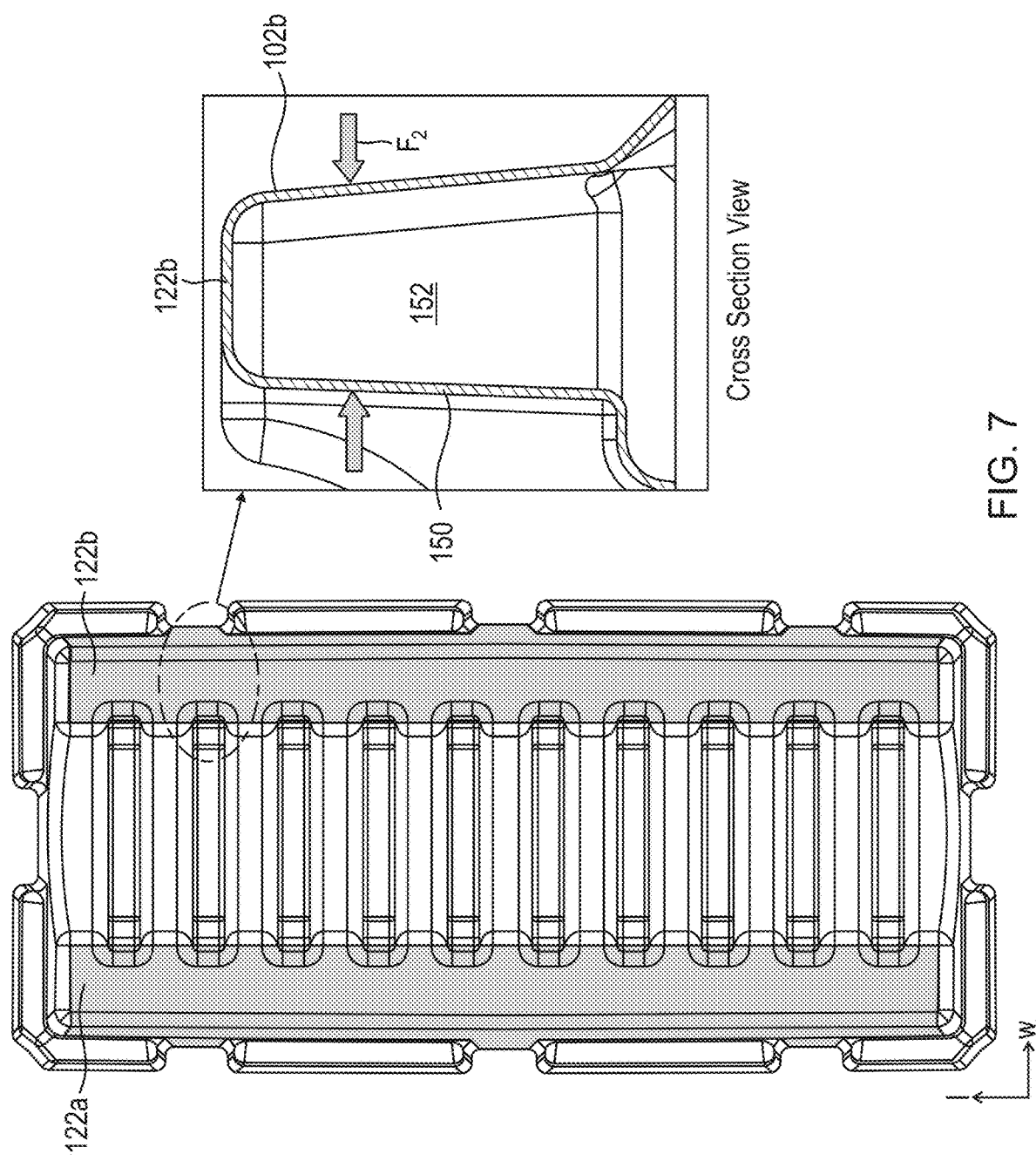
FIG. 7 is a top view of the tray of FIG. 1 highlighting a second layer of impact absorption provided by portions of the tray top and the tray sidewalls and including a cross-section illustration through these portions in accordance with one or more aspects of the disclosure.

FIG. 6 is a top view of the tray of FIG. 1 highlighting a first layer of impact absorption provided by the side extensions and corner extensions and including a cross-section illustration through a side extension. FIG. 7 is a top view of the tray of FIG. 1 highlighting a second layer of impact absorption provided by portions of the tray top and the tray sidewalls and including a cross-section illustration through these portions.

Figure 8:
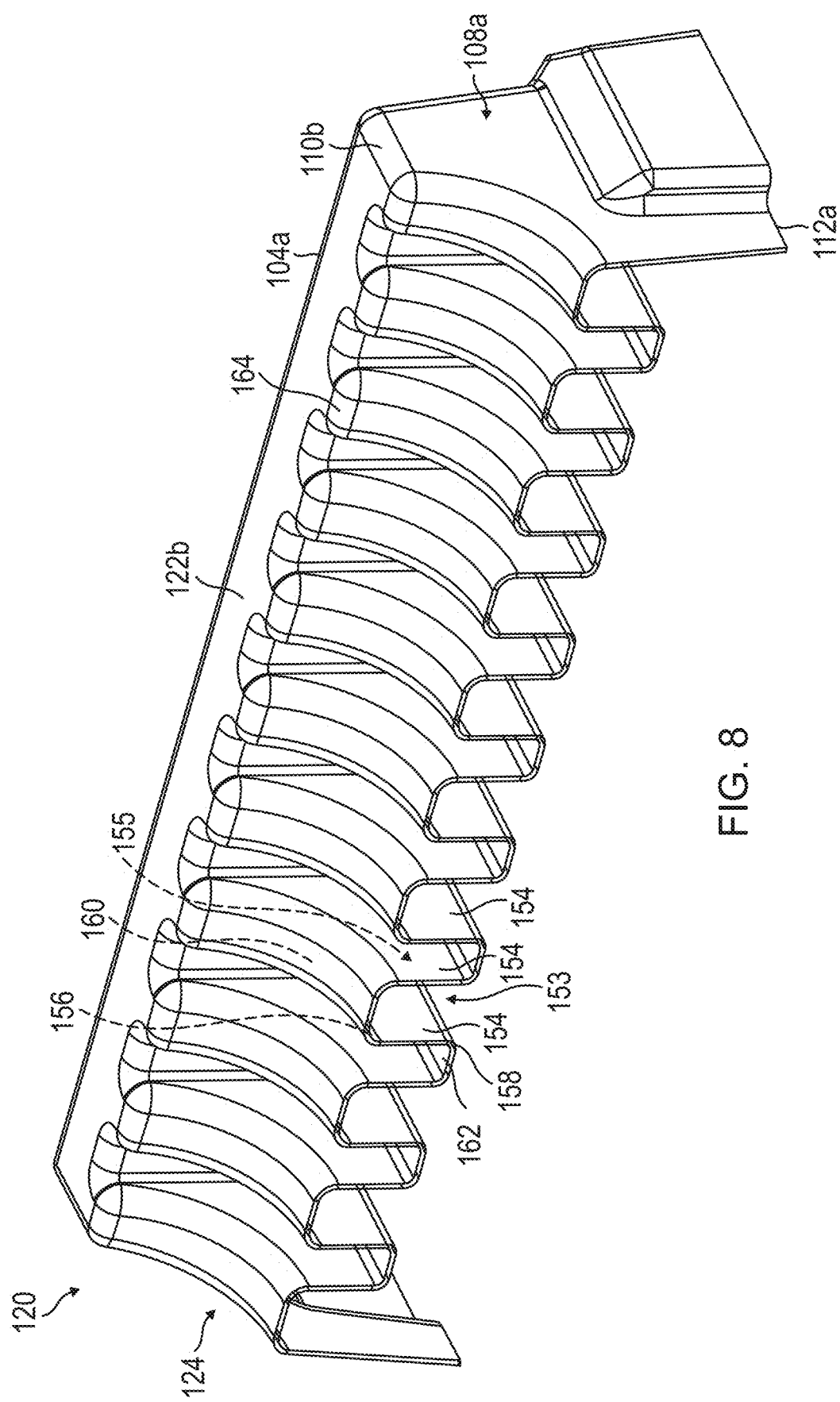
FIG. 8 is a top perspective illustration of a half of the tray of FIG. 1 sectioned along the length of the tray in accordance with one or more aspects of the disclosure.
Figure 9:
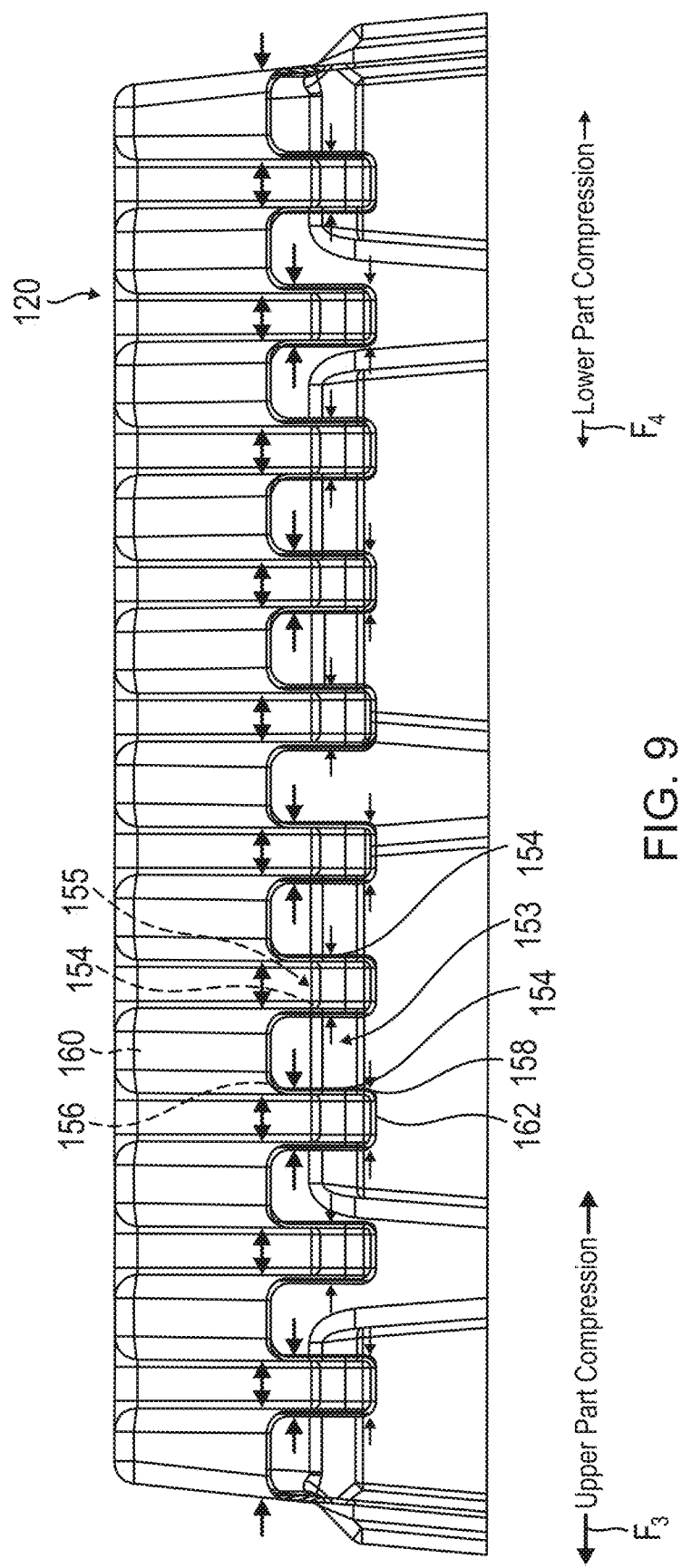
FIG. 9 is a side view of the tray half of FIG. 8 and illustrating areas of upper compression and lower compression provided by the tray top in accordance with one or more aspects of the disclosure.
Figure 10:
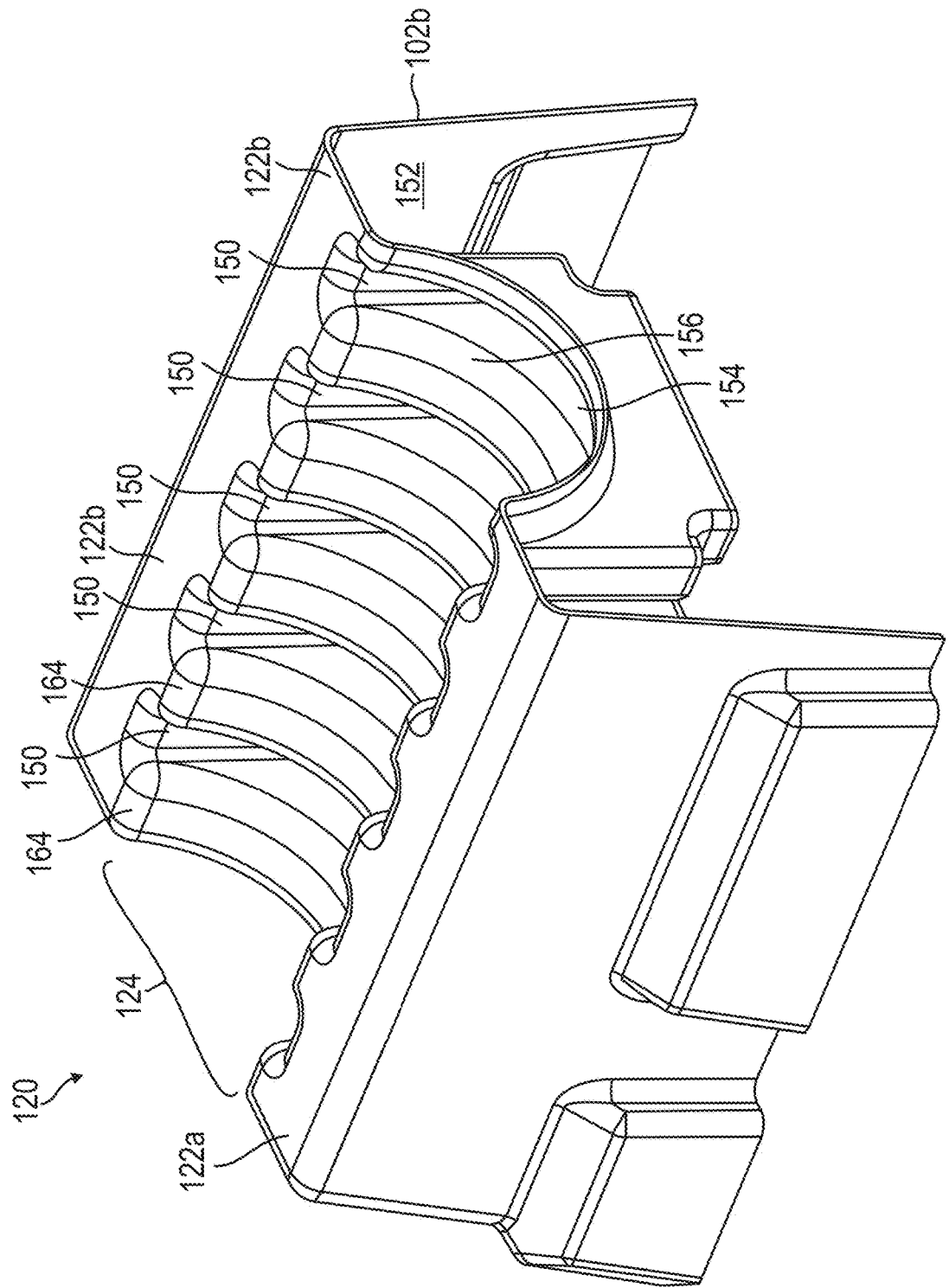
FIG. 10 is a top perspective illustration of a half of the tray of FIG. 1 sectioned along the width of the tray in accordance with one or more aspects of the disclosure.
Figure 11:
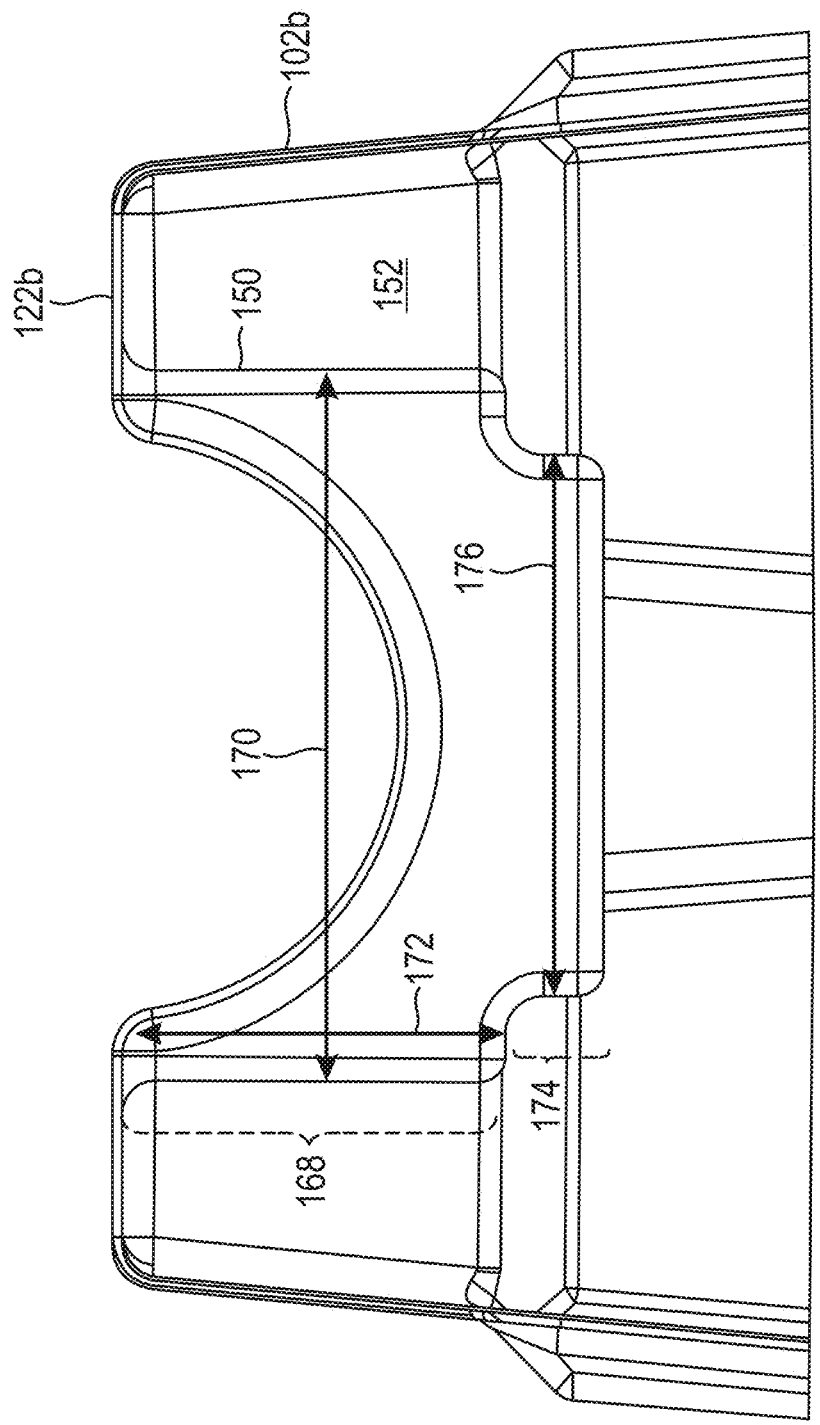
FIG. 11 is an end view of the tray half of FIG. 10 and illustrating the different widths of the slots formed by the tray top in accordance with one or more aspects of the disclosure.

FIG. 8 is a top perspective illustration of a half of the tray of FIG. 1 sectioned along the length of the tray. FIG. 9 is a side view of the tray half of FIG. 8 and illustrating areas of upper compression and lower compression provided by the tray top. FIG. 10 is a top perspective illustration of a half of the tray of FIG. 1 sectioned along the width of the tray. FIG. 11 is an end view of the tray half of FIG. 10 and illustrating the different widths of the slots formed by the tray top.

Continuing with reference to FIGS. 1-11, in accordance with embodiments disclosed herein a tray 100 for holding storage drives includes a sheet of material formed to include a plurality of tray sidewalls 102a, 102b and a plurality of tray ends walls 108a, 108b. The sheet of material may be a thermoforming material having a gauge in the range of 0.9 mm to 1.5 mm (0.039 to 0.059 inches). The sheet of thermoforming material may be for example, one or more of: high-density polyethylene (HDPE), polyvinyl chloride (PVC), acrylonitrile butadiene styrene (ABS), high-impact polystyrene (HIPS), polyethylene terephthalate (PET), and thermoplastic polyolefin (TPO). The sheet of thermoforming material may be a recyclable material, such as HDPE. The sheet of material may be a thermoforming material that has a Shore D hardness in the range of 55 to 100 when cooled down after forming.

With continued reference to FIGS. 1-11, each of the plurality of tray sidewalls 102a, 102b has a top edge 104a, 104*b* and a bottom edge 106*a*, 106*b*. Each of the plurality of tray ends walls 108*a*, 108*b* has a top edge 110*a*, 110*b* and a bottom edge 112*a*, 112*b*. The plurality of tray ends walls 108*a*, 108*b* are arranged relative to the plurality of tray sidewalls 102*a*, 102*b* to define a plurality of corner regions 114. In the example embodiment of FIGS. 1-11, two tray sidewalls 102*a*, 102*b* and two tray ends walls 108*a*, 108*b* define a tray 100 having four corner regions 114.

The sheet of material is also formed to include: 1) at least one side extension 116 in each of the tray sidewalls 102*a*, 102*b*, 2) at least one corner extension 118 in a corner region 114, and 3) a tray top 120 that spans the tray sidewalls 102*a*, 102*b* and the tray ends walls 108*a*, 108*b*. In the example embodiment of FIGS. 1-11, the tray 100 includes two side extensions 116 in each tray sidewalls 102*a*, 102*b* and one corner extension 118 in each corner region 114. The tray top 120 includes a pair of top-side surfaces 122*a*, 122*b* that extend inward from the top edge 104*a*, 104*b* of a respective one of the tray sidewalls 102*a*, 102*b*, and a central slotted structure 124 that spans the top-side surfaces 122*a*, 122*b*. The central slotted structure 124 forms a plurality of slots 126, each configured to receive a storage drive. In the example embodiment of FIGS. 1-11, the tray 100 includes ten slots 126 arranged parallel to each other in a single row.

At least one of the plurality of tray sidewalls 102*a*, 102*b*, the plurality of tray ends walls 108*a*, 108*b*, the at least one side extension 116, the at least one corner extension 118, and the tray top 120 have a thickness substantially equal to the thickness of the sheet of material. Substantially equal to may mean for example, that the thickness of these features of the tray 100 are within +/−0.5 mm (+/−0.020 inches) of the thickness of the sheet of material.

With reference to the embodiment of FIGS. 1-11, the side extensions 116 of the tray 100 include an extension top wall 128, an extension impact wall 130, and a pair of extension side walls 132. The extension top wall 128 extends outward from a planar portion 129 of the tray sidewall 102*a*, 102*b*. The extension impact wall 130 extends downward from the extension top wall 128 to the bottom edge 106*a*, 106*b* of the tray sidewall 102*a*, 102*b*. The pair of extension side walls 132 extend outward from the planar portion 129 of the tray sidewall 102*a*, 102*b* to the extension impact wall 130.

In the embodiment of FIGS. 1-11, the extension top wall 128 lies in a plane at an angle θ relative to the planar portion 129 of the tray sidewall 102*a*, 102*b*. The angle θ may be for example, between 130 and 150 degrees. The extension impact wall 130 lies in a plane substantially parallel with the planar portion 129 of the tray sidewall 102*a*, 102*b*. "Substantially parallel" as used herein means the extension impact wall 130 may be in a plane up to 10 percent off of parallel with respect to the planar portion 129.

With reference to FIG. 6, the space 131 bounded by the extension top wall 128, the extension impact wall 130, and the extension side walls 132 of the at least one side extension 116 is an empty space. As described later below, the empty space 131 defined by the side extensions 116 of the tray 100 provides a first layer of impact absorption to the tray 100.

With reference to FIGS. 1-11, the corner extensions 118 include a tray sidewall portion 134, a tray end wall portion 142, and an angled side wall 149. The tray sidewall portion 134 includes an extension top wall 136 that extends outward from a planar portion 129 of the tray sidewall 102*a*, 102*b*, an extension impact wall 138 that extends downward from the extension top wall 136 to the bottom edge 106*a*, 106*b* of the tray sidewall 102*a*, 102*b*, and an extension side wall 140 that extends outward from the planar portion 129 of the tray sidewall 102*a*, 102*b* to the extension impact wall 138.

The tray end wall portion 142 includes an extension top wall 144 that extends outward from a planar portion 133 of the tray end wall 108*a*, 108*b*, an extension impact wall 146 that extends downward from the extension top wall 144 to the bottom edge 106*a*, 106*b* of the tray end wall 108*a*, 108*b*, and an extension side wall 148 extending outward from the planar portion 133 of the tray end wall 108*a*, 108*b* to the extension impact wall 146. The angled side wall 149 spans the extension impact wall 138 of the tray sidewall 102*a*, 102*b* and the extension impact wall 146 of the tray end wall 108*a*, 108*b*.

With reference to FIG. 6, the space 131 bounded by the extension top walls 136, 144, the extension impacts walls 138, 146, the extension side walls 40, 148, and the angled side wall 149 of the corner extension 118 is an empty space. As described immediately below, the empty space 131 defined by the corner extensions 118 of the tray 100 provides a first layer of impact absorption to the tray.

With reference to FIG. 6, the side extensions 116 and the corner extensions 118 around the perimeter of the tray 100 provide a first line or layer of impact absorption around the tray. From the cross-sectional view in FIG. 6, the thin-walled construction of the side extensions 116 and the corner extensions 118 and the open spaces 131 associated with the extensions 116, 118 improve the flexibility of the tray sidewalls 102*a*, 102*b* and tray end walls 108*a*, 108*b* and allow the tray 100 to compress upon impact of a force $F_1$ to an extension impact wall 130, 138, 146. This increases the duration of impact of the force $F_1$ to the content of the tray 100 and thereby generates a lower G value than would occur for a tray without such a feature.

With reference to FIGS. 1-11, the tray top 120 includes a plurality of slot sidewalls 150 that extend downward from a respective one of the top-side surfaces 122*a*, 122*b*. As shown in FIG. 7, the space 152 between the plurality of slot sidewalls 150 and the respective one of the tray sidewalls 102*a*, 102*b* is an empty space 152. As described below, the empty space 152 defined by the slot sidewalls 150, the top-side surfaces 122*a*, 122*b*, and the tray sidewalls 102*a*, 102*b* of the tray 100 provides a second line or layer of impact absorption along the length l of the tray. From the cross-sectional view in FIG. 7, the thin-walled construction of the slot sidewalls 150, the top-side surfaces 122*a*, 122*b*, and the tray sidewalls 102*a*, 102*b* of the tray 100 and the open spaces 152 associated with these features improve the flexibility of the upper portions of the tray sidewalls 102*a*, 102*b* and allow the tray 100 to compress upon impact of a force $F_2$ to an upper portion of a tray sidewall 102*a*, 102*b*. This increases the duration of impact of the force $F_2$ to the content of the tray 100 and thereby generates a lower G value than would occur for a tray without such a feature.

With reference to FIGS. 8-10, the central slotted structure 124 of the tray top 120 includes a plurality of divider walls 154, a plurality of divider tops 160, a plurality of slot bottoms 162, and a plurality of slot sidewalls 150. Each divider wall 154 has a rounded top edge 156, a rounded bottom edge 158. The central slotted structure 124 also has rounded side edges 164 that extend between the ends of each divider top 160 and a respective one of the top-side surfaces 122*a*, 122*b*. Each divider top 160 spans the rounded top edges 156 of an adjacent pair of the divider walls 154. Each slot bottom 162 spans the bottom edges 158 of an adjacent pairs of the divider walls 154.

As shown in FIG. 8, the space 153 between the divider walls 154 of each adjacent pair of the divider walls 154 spanned by a divider top 160 is an empty space. The space 155 between the divider walls 154 of each adjacent pairs of the divider walls 154 spanned by a slot bottom 162 forms part of one of the plurality of slots 126.

With reference to FIGS. 8 and 9, the thin-walled construction of the central slotted structure 124 and the continuous, alternating rounded top edges 156 and rounded bottom edges 158 in the region of the center of the central slotted structure 124 and empty spaces 153, 155 formed thereby further enhance the impact absorption capability of the tray 100. As shown in FIG. 9, each empty space 155 or slot 126 of the tray 100 has an upper compression region near the rounded top edges 156 that provides impact absorption upon impact of an upper compression force $F_3$, and a lower compression region near the rounded bottom edges 158 that provides impact absorption upon impact of an lower compression force $F_4$. The combination of the upper and lower upper compression regions provides additional protection for each storage drive in a slot 126 defined by the empty space 155.

With reference to FIGS. 8-11, each slot sidewall 150 spans the side edges 164 of an adjacent pair of the divider walls 154. Each slot bottom 162 spans the rounded bottom edges 158 of an adjacent pair of the divider walls 154. Each pair of adjacent divider walls 154 spanned by a pair of slot sidewalls 150 and a slot bottom 162 form a slot 126 of the plurality of slots 126.

Each of the plurality of slots 126 includes an upper portion 168 having a width 170 and a depth 172 sized to receive the width and thickness of the storage drive 202. The plurality of slots 126 further comprise a lower portion 174 having a width 176 less than the width of the storage drive 202.

While the foregoing description of a tray in accordance with one or more aspects of the disclosure is directed to the embodiment of a tray 100 shown FIGS. 1-11, other embodiments of a tray are contemplated. For example, a tray may be formed to include more or less than ten slots 126, or to include two or more side-by-side rows of slots, or to include a different sized slot or slots of various sizes, or to accommodate objects with form factors different from a storage drive.

Tray with Storage Drives

Figure 12:
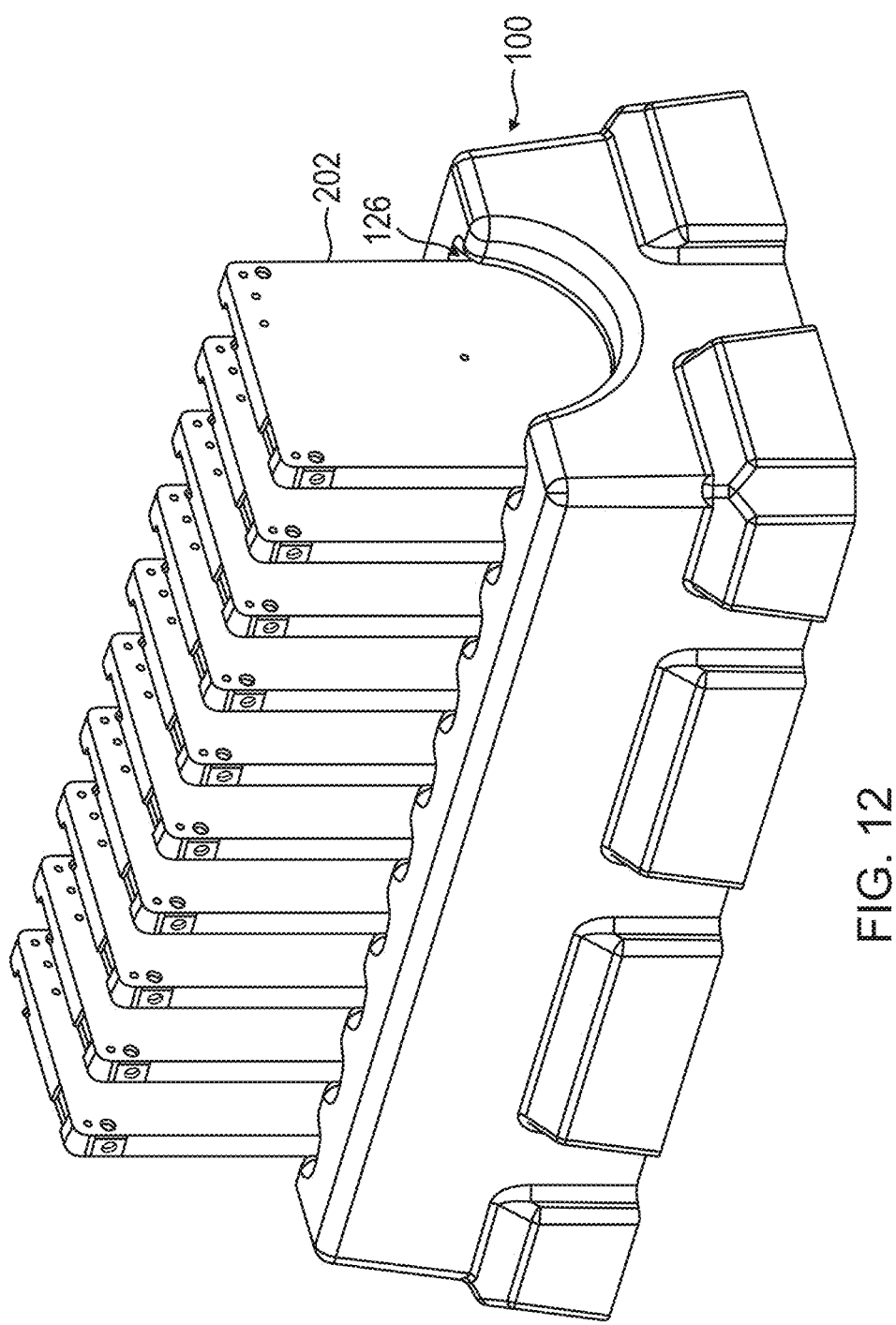
FIG. 12 is a top perspective illustration of the tray of FIG. 1 with storage drives inserted in the slots in accordance with one or more aspects of the disclosure.
Figure 13:
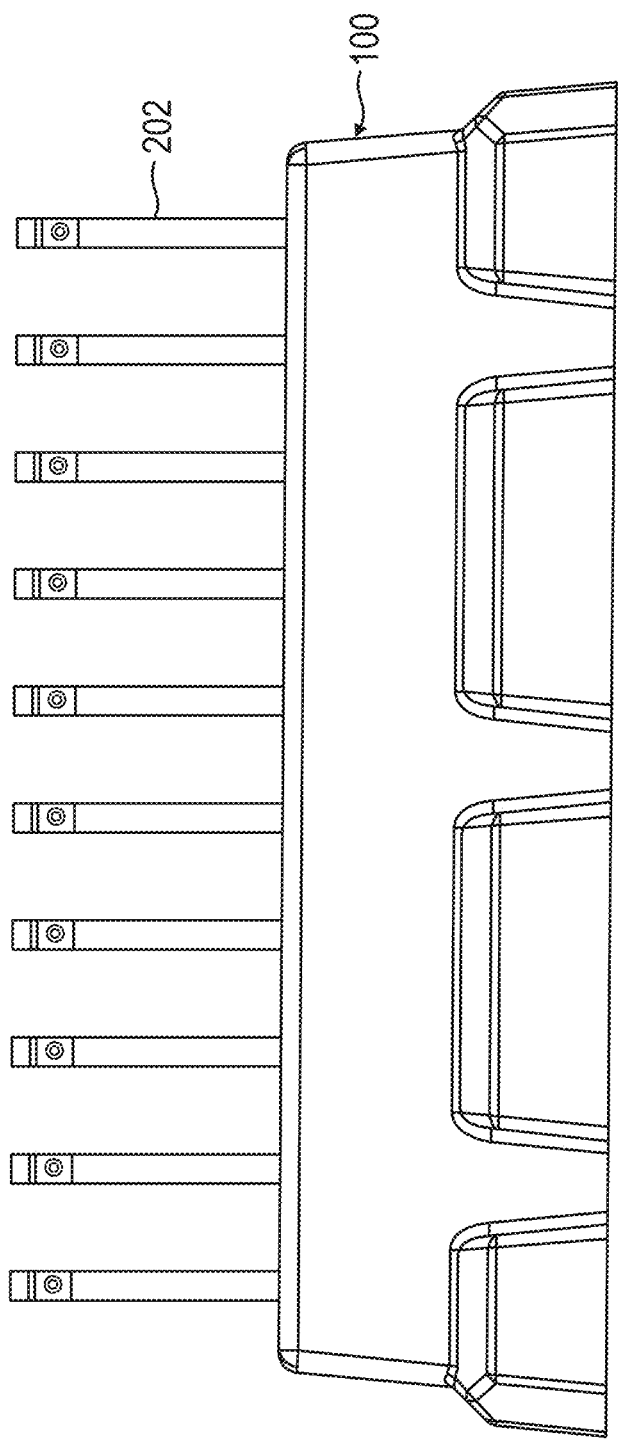
FIG. 13 is a side view of the tray of FIG. 12 in accordance with one or more aspects of the disclosure.
Figure 14:
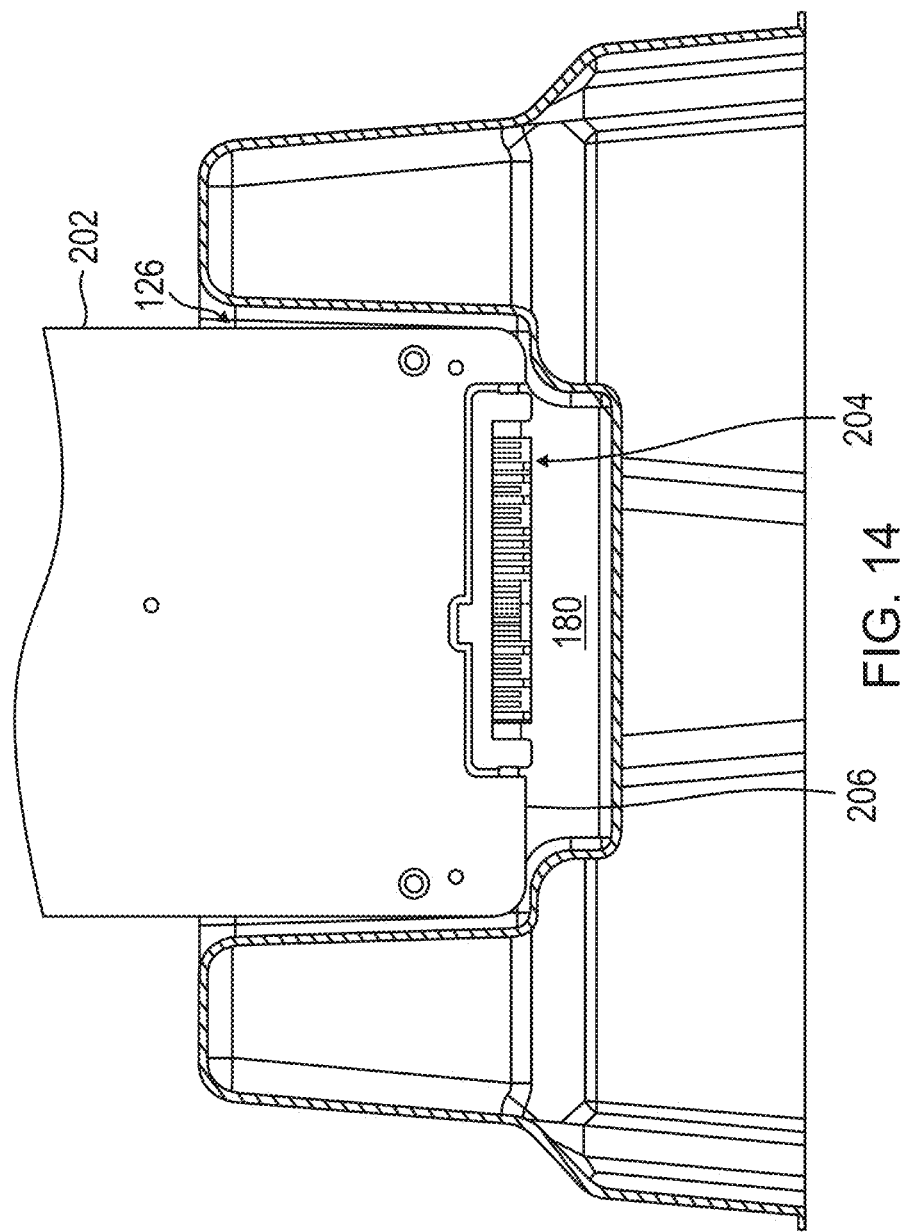
FIG. 14 is a cross-section illustration through the width of the tray of FIG. 12 showing a fit of a storage drive inserted in a slot in accordance with one or more aspects of the disclosure.

FIGS. 12-14 illustrate the tray 100 of FIGS. 1-11 with storage drives 202 inserted in accordance with one or more aspects of the disclosure. FIG. 12 is a top perspective illustration of the tray 100 of FIG. 1 with storage drives 202 inserted in the slots 126. FIG. 13 is a side view of the tray 100 of FIG. 12. FIG. 14 is a cross-section illustration through the width of the tray 100 of FIG. 12 showing a fit of a storage drive 202 inserted in a slot 126.

With further reference to FIG. 14, in some configurations the connector 204 of a storage drive 202 protrudes slightly out from the drive casing 206. For these configurations, the connector 204 may break upon impact of the tray 100 by an external force if the connector is in direct contact with a surface of the tray 100. In accordance with embodiments disclosed herein, the varying widths 170, 176 of the slots 126 provide an open space 180 beneath the connector 204 such that the connector 204 does not contact a surface of the tray 100. Thus, the tray 100 provides open space 180 around the connector 204 area in a way that no matter which direction the impact originated from, the connector does not contact any surface of the tray.

Packaging Assembly

Figure 15:
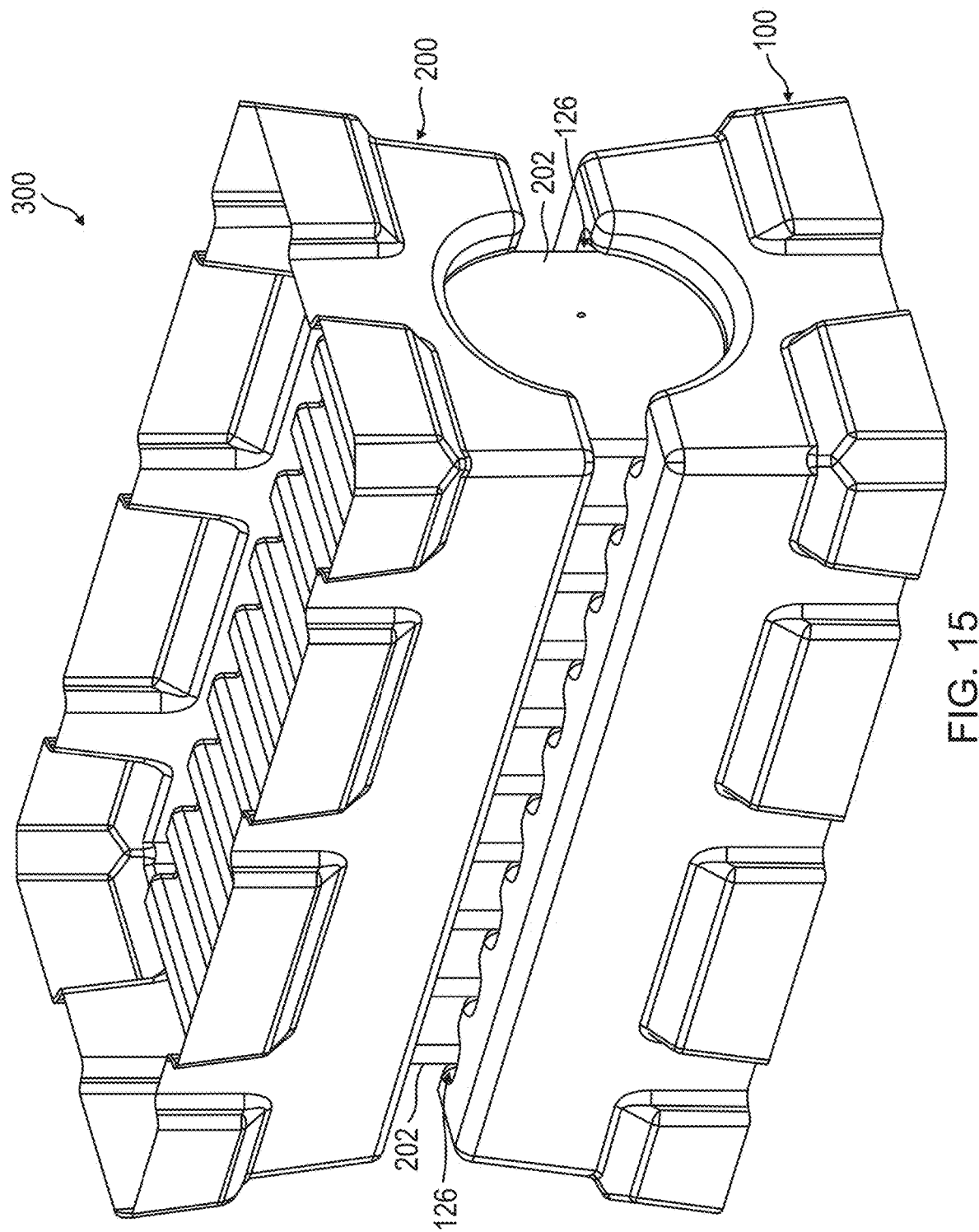
FIG. 15 is a top perspective illustration of a packaging assembly including a pair of identical trays of FIG. 1 with storage drives inserted in accordance with one or more aspects of the disclosure.
Figure 16:
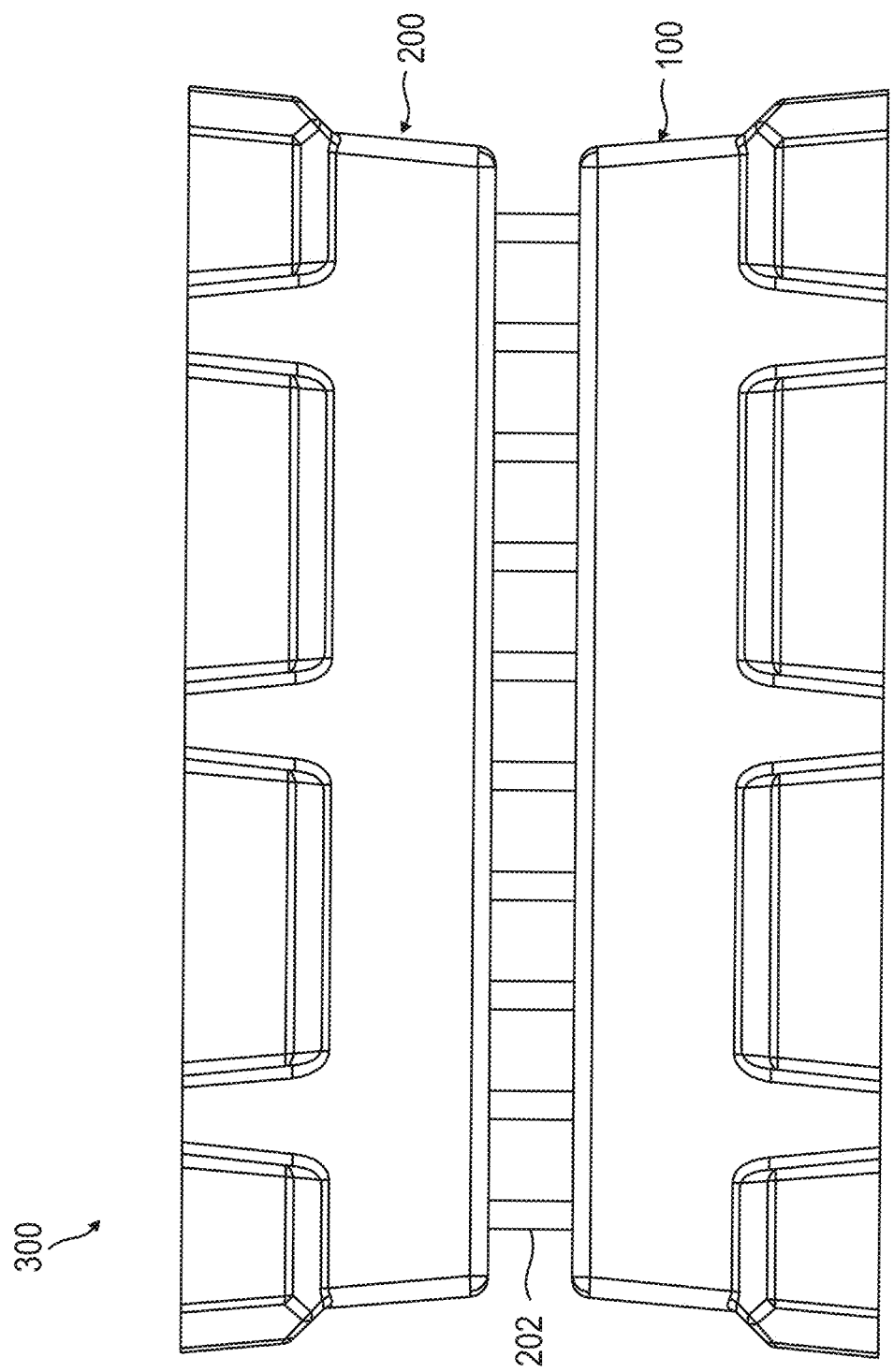
FIG. 16 is a side view of the packaging assembly of FIG. 15 in accordance with one or more aspects of the disclosure.
Figure 17:
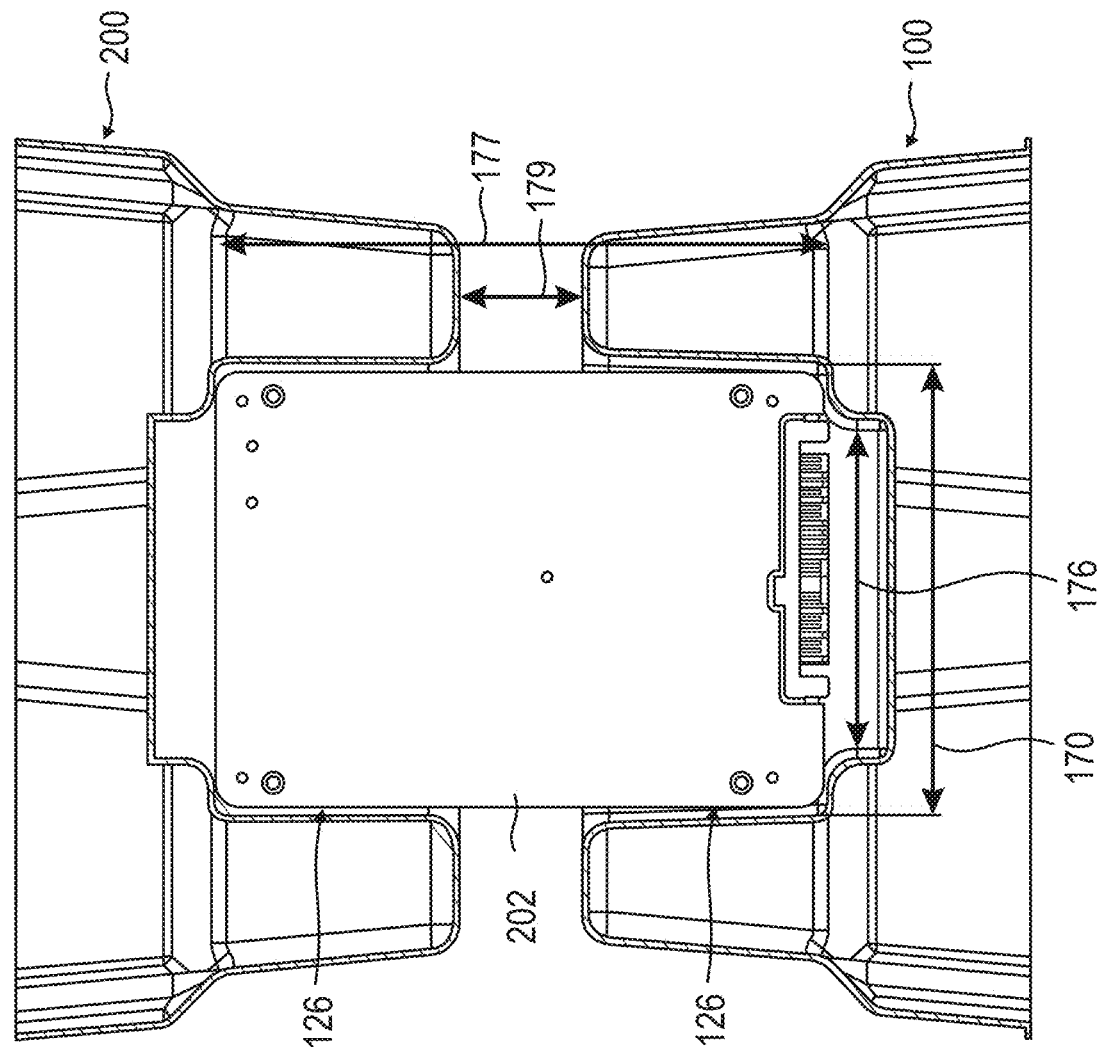
FIG. 17 is a cross-section illustration through the width of the packaging assembly of FIG. 15 showing a fit of a storage drive inserted in a respective slot of each of a pair of identical trays in accordance with one or more aspects of the disclosure.

FIGS. 15-17 illustrate a packaging assembly 300 comprising a pair of trays 100, 200 of FIGS. 1-11 in accordance with one or more aspects of the disclosure. FIG. 15 is a top perspective illustration of a packaging assembly 300 including a pair of identical trays of FIG. 1 with storage drives 202 inserted in slots 126. FIG. 16 is a side view of the packaging assembly 300 of FIG. 15. FIG. 17 is a cross-section illustration through the width of the packaging assembly 300 of FIG. 15 showing a fit of a storage drive 202 inserted in a respective slot 126 of each of a pair of identical trays 100, 200.

With continued reference to FIGS. 15-17, in accordance with embodiments disclosed herein a packaging assembly 300 includes a pair of identical trays 100, 200 configured as described above with reference to FIGS. 1-11. The pair of identical trays 100, 200 are configured to at least partially enclose one or more storage drives 202 for shipping. To this end, a first tray 100 may be oriented to function as a bottom tray 100. Storage drives 202 are placed in the slots 126 of the bottom tray 100. A second tray 200 is oriented to function as a top tray 200 having it slots 126 facing toward and aligned to receive the exposed ends of the storage drives 202 placed in the slots 126 of the bottom tray 100. The top tray 200 is then lowered such that each slot 126 of the top tray 200 receives an exposed end of a storage drive 202. The combination of the bottom tray 100 and the top tray 200 have a form factor that fits inside a shipping box or container and thus function as protective packaging for the storage drives 202 during transportation.

The design of the tray 100 allows it to be used as a bottom tray and a top tray. This dual use tray 100 eliminates the need for different top and bottom trays and thus reduces production costs. The universal tray 100 also removes folding processes as required in some current packaging designs, including the design disclosed in U.S. Patent Application Publication No. 2011/0079538.

With further reference to FIG. 17, slots 126 of a packaging assembly 300 may be configured to accommodate storage drives 202 of various widths and thicknesses. In one example configuration, the width 170 of the slots 126 is 72 mm while the depth of the slots 126 is 40 mm. The packaging assembly 300 may accommodate is storage drives 202 of various heights. In the example packaging assembly 300 of FIG. 17, a storage drive 202 having a height of 102 mm is secured between the bottom tray 100 and the top tray 200, with a gap 179 present between surfaces of the trays 100, 200.

Method of Fabrication

Figure 18:
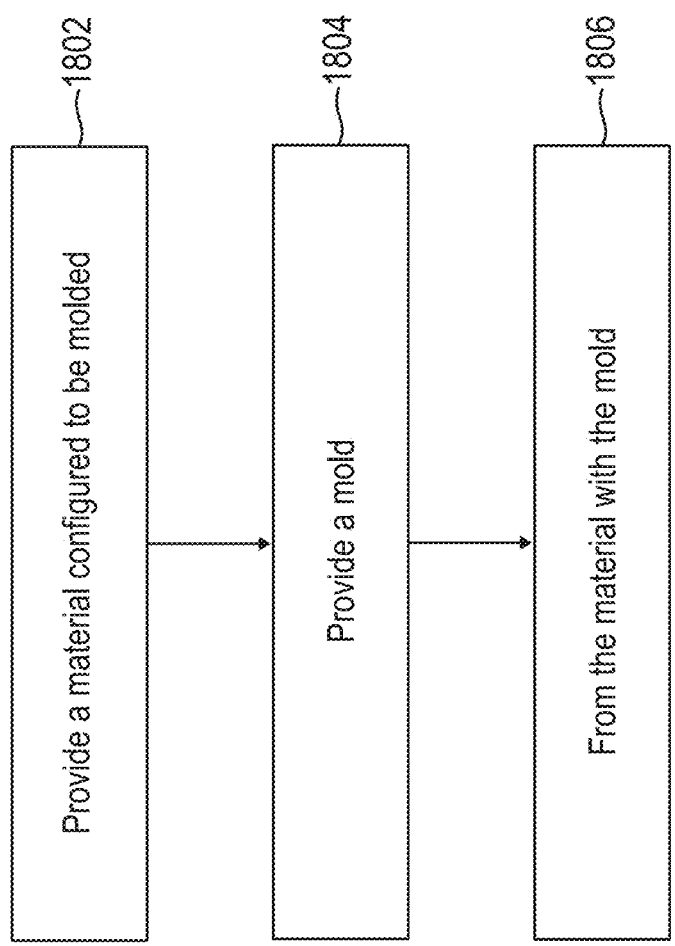
FIG. 18 is a flowchart of a method of manufacturing the tray of FIG. 1 in accordance with one or more aspects of the disclosure.

With reference to FIG. 18, in accordance with embodiments disclosed herein a method of fabricating a tray 100 includes, at block 1802, providing a material configured to be molded.

At block 1804, the method of fabricating a tray 100 also includes providing a mold. The mold can be fabricated from aluminum plate block and machined to the specific shape and dimensions.

At block 1806, the method of fabricating a tray 100 also includes forming the material with the mold to include the features of the tray as described above with reference to FIGS. 1-11.

In some embodiments, the material comprises a sheet of thermoforming material having a pliable forming temperature, and forming the material with the mold includes heating the sheet of thermoforming material to the pliable forming temperature, allowing the sheet of thermoforming material to conform to the mold and to cool to a temperature less than the pliable forming temperature, and trimming the formed sheet of thermoforming material.

The sheet of thermoforming material comprises at least one of: high-density polyethylene (HDPE), polyvinyl chloride (PVC), acrylonitrile butadiene styrene (ABS), high-impact polystyrene (HIPS), polyethylene terephthalate (PET), and thermoplastic polyolefin (TPO).

While the foregoing description of the manufacturing of a tray in accordance with one or more aspects of the disclosure includes details directed to thermoforming, other manufacturing techniques are contemplated. For example, a tray may be fabricated through injection molding as well.

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

What is claimed is:

1. A tray for holding a plurality of storage drives, the tray comprising a sheet of material having a thickness and formed to include:
   a plurality of tray sidewalls, each having a top edge and a bottom edge;
   a plurality of tray end walls arranged relative to the plurality of tray sidewalls to define a plurality of corner regions, each tray end wall having a top edge and a bottom edge;
   at least one side extension included in each of the tray sidewalls, the at least one side extension extending outward from a planar portion of its respective tray sidewall;
   at least one corner extension included in a corner region, the at least one corner extension extending outward from a planar portion of one of the tray sidewalls and a planar portion of one of the tray end walls; and
   a tray top spanning the tray sidewalls and the tray end walls, the tray top comprising:
      a pair of top-side surfaces that extend inward from the top edge of a respective one of the tray sidewalls, and
      a central slotted structure spanning the top-side surfaces, the central slotted structure forming a plurality of slots, each slot configured to receive one of the plurality of storage drives,
   wherein the plurality of tray sidewalls, the plurality of tray end walls, the at least one side extension, the at least one corner extension, and the tray top have a thickness substantially equal to the thickness of the sheet of material.

2. The tray of claim 1, wherein the at least one side extension comprises:
   an extension top wall extending outward from the planar portion of the tray sidewall;
   an extension impact wall extending downward from the extension top wall to the bottom edge of the tray sidewall; and
   a plurality of extension side walls extending outward from the planar portion of the tray sidewall to the extension impact wall.

3. The tray of claim 2, wherein the extension top wall lies in a plane at an angle between A and B degrees relative to the planar portion of the tray sidewall.

4. The tray of claim 2, wherein the extension impact wall lies in a plane substantially parallel with the planar portion of the tray sidewall.

5. The tray of claim 2, wherein a space bounded by the extension top wall, the extension impact wall, and the extension side walls of the at least one side extension is an empty space.

6. The tray of claim 1, wherein the at least one corner extension comprises:
   a tray sidewall portion comprising:
      an extension top wall extending outward from the planar portion of the tray sidewall,
      an extension impact wall extending downward from the extension top wall to the bottom edge of the tray sidewall, and
      an extension side wall extending outward from the planar portion of the tray sidewall to the extension impact wall;
   a tray end wall portion comprising:
      an extension top wall extending outward from the planar portion of the tray end wall,
      an extension impact wall extending downward from the extension top wall of the tray end wall portion to the bottom edge of the tray end wall, and
      an extension side wall extending outward from the planar portion of the tray end wall to the extension impact wall of the tray end wall portion; and
   an angled side wall spanning the extension impact wall of the tray sidewall and the extension impact wall of the tray end wall.

7. The tray of claim 6, wherein a space bounded by the extension top walls, the extension impact walls, the extension side walls, and the angled side wall of the at least one corner extension is an empty space.

8. The tray of claim 1, wherein the tray top further comprises:
a plurality of slot sidewalls that extend downward from a respective one of the top-side surfaces,
wherein a space between the plurality of slot sidewalls and a respective one of the tray sidewalls is an empty space.

9. The tray of claim 1, wherein the central slotted structure of the tray top comprises:
a plurality of divider walls, each having a top edge and a bottom edge;
a plurality of divider tops, each spanning the top edges of an adjacent pair of the divider walls; and
a plurality of slot bottoms, each spanning the bottom edges of an adjacent pair of the divider walls.

10. The tray of claim 9, wherein a space between each adjacent pair of the divider walls spanned by a divider top is an empty space.

11. The tray of claim 9, wherein a space between each adjacent pairs of the divider walls spanned by a slot bottom forms part of one of the plurality of slots.

12. The tray of claim 1, wherein the plurality of slots of the central slotted structure are arranged parallel each other in a single row.

13. The tray of claim 1, wherein the central slotted structure comprises:
a plurality of divider walls, each having a pair of side edges and a bottom edge;
a plurality of slot sidewalls, each spanning the side edges of an adjacent pair of the divider walls; and
a plurality of slot bottoms, each spanning the bottom edges of an adjacent pair of the divider walls,
wherein each pair of adjacent divider walls spanned by a pair of slot sidewalls and a slot bottom form a slot of the plurality of slots.

14. The tray of claim 13, wherein each of the plurality of slots comprises an upper portion having a width and a depth sized to receive the width and thickness of a storage drive.

15. The tray of claim 13, wherein each of the plurality of slots further comprises a lower portion having a width less than the width of a storage drive.

16. The tray of claim 1, wherein the sheet of material comprises a thermoforming material having a gauge in the range of 0.9 mm to 1.5 mm.

17. A packaging assembly comprising a pair of identical trays, each tray comprising:
a plurality of tray sidewalls, each having a top edge and a bottom edge;
a plurality of tray end walls arranged relative to the plurality of tray sidewalls to define a plurality of corner regions, each tray end wall having a top edge and a bottom edge;
at least one side extension included in each of the tray sidewalls, the at least one side extension extending outward from a planar portion of its respective tray sidewall;
at least one corner extension included in a corner region, the at least one corner extension extending outward from a planar portion of one of the tray sidewalls and a planar portion of one of the tray end walls; and
a tray top spanning the tray sidewalls and the tray end walls, the tray top comprising:
a pair of top-side surfaces that extend inward from the top edge of a respective one of the tray sidewalls, and
a central slotted structure spanning the top-side surfaces, the central slotted structure forming a plurality of slots, each slot configured to receive one of a plurality of storage drives,
wherein, the pair of identical trays are configured to at least partially enclose one or more storage drives for shipping.

18. A tray for holding a plurality of storage drives, the tray comprising a sheet of material having a thickness and formed to include:
a plurality of tray sidewalls, each having a top edge and a bottom edge;
a plurality of tray end walls arranged relative to the plurality of tray sidewalls to define a plurality of corner regions, each tray end wall having a top edge and a bottom edge;
at least one side extension included in each of the tray sidewalls;
at least one corner extension included in a corner region; and
a tray top spanning the tray sidewalls and the tray end walls, the tray top comprising:
a pair of top-side surfaces that extend inward from the top edge of a respective one of the tray sidewalls, and
a central slotted structure spanning the top-side surfaces, the central slotted structure forming a plurality of slots, each slot configured to receive one of the plurality of storage drives,
wherein the plurality of tray sidewalls, the plurality of tray end walls, the at least one side extension, the at least one corner extension, and the tray top have a thickness substantially equal to the thickness of the sheet of material, and
wherein the at least one side extension comprises:
an extension top wall extending outward from a planar portion of the tray sidewall;
an extension impact wall extending downward from the extension top wall to the bottom edge of the tray sidewall; and
a plurality of extension side walls extending outward from the planar portion of the tray sidewall to the extension impact wall.

19. A method of fabricating a tray, the method comprising:
providing a material configured to be molded;
providing a mold; and
forming the material with the mold to form a tray that includes:
a plurality of tray sidewalls, each having a top edge and a bottom edge;
a plurality of tray ends walls arranged relative to the plurality of tray sidewalls to define a plurality of corner regions, each tray end wall having a top edge and a bottom edge;
at least one side extension included in each of the tray sidewalls, the at least one side extension extending outward from a planar portion of its respective tray sidewall;
at least one corner extension included in a corner region, the at least one corner extension extending outward from a planar portion of one of the tray sidewalls and a planar portion of one of the tray end walls; and
a tray top spanning the tray sidewalls and the tray ends walls, the tray top comprising:

a pair of top-side surfaces that extend inward from the top edge of a respective one of the tray sidewalls, and a central slotted structure spanning the top-side surfaces, the central slotted structure forming a plurality of slots, each slot configured to receive a storage drive, wherein the plurality of tray sidewalls, the plurality of tray end walls, the at least one side extension, the at least one corner extension, and the tray top have a thickness substantially equal to the thickness of the sheet of material.

20. The method of claim 19, wherein the material comprises a sheet of thermoforming material having a pliable forming temperature, and forming the material with the mold comprises:

heating the sheet of thermoforming material to the pliable forming temperature, allowing the sheet of thermoforming material to conform to the mold and to cool to a temperature less than the pliable forming temperature, and trimming the formed sheet of thermoforming material.

21. The method of claim 20, wherein the sheet of thermoforming material comprises at least one of: high-density polyethylene (HDPE), polyvinyl chloride (PVC), acrylonitrile butadiene styrene (ABS), high-impact polystyrene (HIPS), polyethylene terephthalate (PET), or thermoplastic polyolefin (TPO).

\* \* \* \* \*